United States Patent [19]

Havashi

[11] Patent Number: 5,039,542
[45] Date of Patent: Aug. 13, 1991

[54] METHOD FOR STRETCHING DOUGH

[75] Inventor: Torahiko Havashi, Utsunomiya, Japan

[73] Assignee: Rheon Automatic Machinery Co., Ltd., Utsunomiya, Japan

[21] Appl. No.: 543,940

[22] Filed: Jun. 25, 1990

Related U.S. Application Data

[62] Division of Ser. No. 307,123, Feb. 6, 1989, Pat. No. 4,957,426.

[30] Foreign Application Priority Data

Feb. 15, 1988 [JP] Japan ................... 63-32357

[51] Int. Cl.$^5$ ........................................... A21D 8/02
[52] U.S. Cl. ..................... 426/502; 426/496
[58] Field of Search ............... 426/496, 502, 519; 425/373, 421, 456

[56] References Cited

U.S. PATENT DOCUMENTS 4,946,699  8/1990  Kageyama et al. .......... 426/502

Primary Examiner—Marianne Cintins
Assistant Examiner—Helen Pratt
Attorney, Agent, or Firm—Guy W. Shoup; Paul J. Winters

[57] ABSTRACT

A method for stretching dough comprising two pairs of rollers and means for imparting vibrations to the dough positioned between the pairs of rollers is provided. In this method, vibrations are imparted to dough, which causes the thixotropic effect in the dough. Such dough can be readily stretched by being subjected to a tensile stress caused by the difference in the peripheral speed of the pairs of rollers. Therefore, dough can be stretched without subjecting it to high pressure during the stretching process.

11 Claims, 2 Drawing Sheets

METHOD FOR STRETCHING DOUGH

This application is a division of application Ser. No. 07/307,123, filed Feb. 6, 1989, now U.S. Pat. No. 4,957,426.

BACKGROUND OF THE INVENTION

1. Field of the Invention

This invention relates to an apparatus and method for stretching dough, and in particular to an apparatus and method for stretching dough in which the elasticity of the gel structure in the dough is prevented from being changed during the method.

2. Prior Art

U.S. Pat. No. 3,593,676 discloses a dough sheeting apparatus. This apparatus is a typical conventional dough stretching apparatus. It comprises a plurality of pairs of compression rollers. In this apparatus dough is supplied to the space between the respective pairs of rollers and is compressed by the upper and lower rollers to have a predetermined thickness. To stretch dough by compression, the dough should be subjected to a pressure higher than the point at which the dough loses its elasticity. In other words, in the conventional process, the dough is stretched by causing an elastic fatigue in the dough. However, such a high pressure destroys the gel structure of the gluten in the dough. As has been known to those skilled in the art, dough whose gel structure has been damaged tends to expand insufficiently when it is baked, resulting in bread of poor quality.

SUMMARY OF THE INVENTION

The object of this invention is to provide an apparatus and method for stretching dough in which the dough is not subjected to pressure higher than the point at which it loses its elasticity, and thus prevent the gel structure of the dough from being damaged. In one aspect of this invention an apparatus for stretching dough is provided, comprising a) an upstream pair and a downstream pair of rollers, each pair of said rollers positioned and spaced apart from each other to provide a path for said dough and rotating in the same direction where they face each other and at the same peripheral speed, b) means for imparting vibrations to said dough positioned between said upstream pair and said downstream pair of rollers, c) means for adjusting said space between the rollers in each pair so that the space between said upstream pair of rollers is wider than that between said downstream pair of rollers, d) means for driving said upstream pair and said downstream pair of rollers so that the peripheral speed of said upstream pair of rollers is slower than that of said downstream pair of rollers.

Further, in another aspect of this invention, a method for stretching dough is provided, comprising a) supplying said dough into a first space between a first pair of rollers rotating in the same direction where they face each other and at the same peripheral speed, and then into a second space, narrower than said first space, between a second pair of rollers positioned downstream of said first pair of rollers and rotating in the same direction where they face each other and at the same peripheral speed, which is faster than said peripheral speed of said first pair of rollers, said first and second spaces being adjustable, b) stretching said dough under tensile stress while vibrations are imparted to said dough by a vibration means positioned between said first and second pairs of rollers.

In this invention, dough is not stretched by compressing it between a pair of rollers, but is stretched by imparting vibrations to it while it is under a tensile stress. Please note that when vibrations are imparted to dough, the thixotropic effect occurs in the dough.

Because of the thixotropic effect, dough in the area to which vibrations are imparted becomes fluid and starts to flow. Therefore, the dough in such a condition can be easily stretched by subjecting it to just a low tensile stress. In this invention vibrations are imparted to the area of the dough located between the upstream pair and the downstream pair of rollers by the means for imparting vibrations while this same area of the dough is subjected to a tensile stress caused by the difference in the peripheral speed of the upstream pair and downstream pair of rollers. Accordingly, the dough can be stretched without being subjected to a high pressure that exceeds the point at which the dough loses its elasticity. Thus, the gel structure of the dough is prevented from being damaged.

EMBODIMENT

Figure 1:
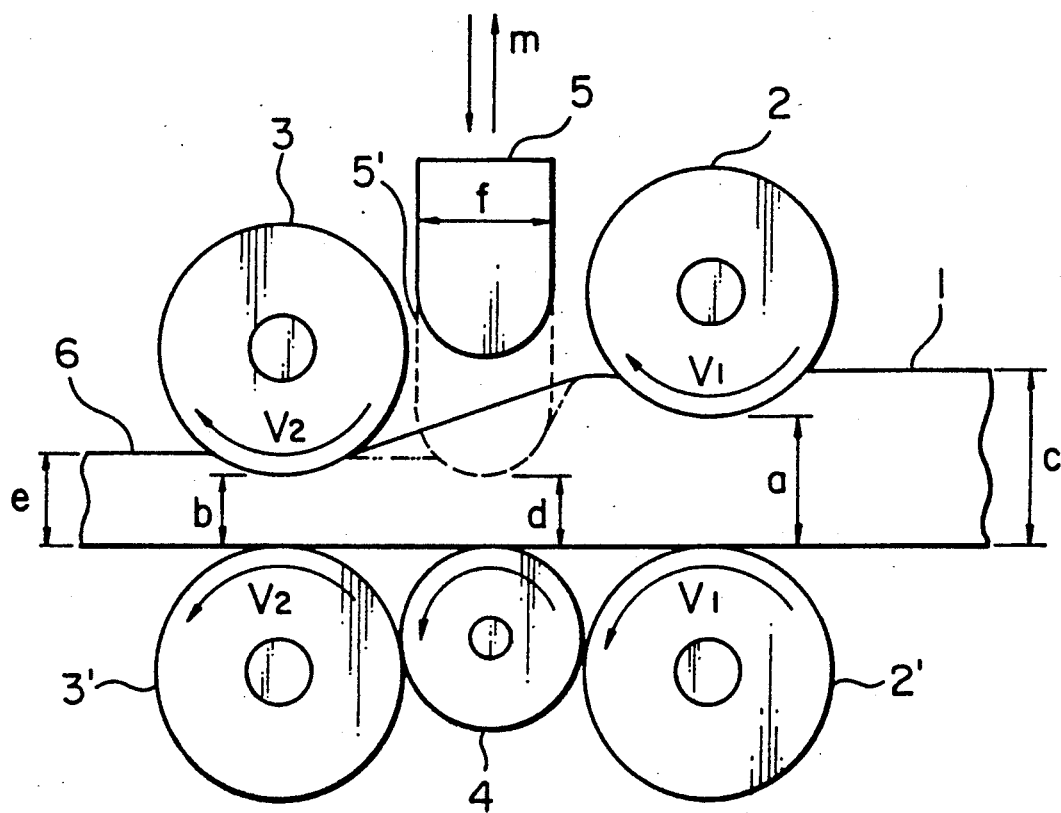
FIG. 1 shows the apparatus for stretching dough of the first embodiment of this invention.

In FIG. 1 the apparatus for stretching dough of a preferred embodiment of this invention is shown. The apparatus comprises a first pair of vertically juxtaposed rollers (2, 2'), a second pair of vertically juxtaposed rollers (3, 3') located downstream of and spaced apart from the first pair of rollers, and a vibration imparting mechanism that includes a transfer roller (4) and a vibration imparting body (5).

The rollers of each pair are positioned spaced apart from each other so that a conveying path for dough (1) is provided between them. In FIG. 1, the distance between the rollers of the first pair where they are closest is a, which is equal to or less than the thickness c of the dough to be stretched (1), and the distance between the rollers of the second pair where they are closest is b, which is equal to or less than the thickness e of the dough after stretching (6). These rollers (2, 2', 3, and 3') are driven through a belt or chain by a driven motor (not shown). These rollers (2, 2', 3, and 3') rotate in the same direction where they face each other as indicated by the arrows in FIG. 1. Rollers of a given pair rotate at the same peripheral speed. The rollers are driven so that the peripheral speed of the first pair of rollers $V_1$ is slower than that of the second pair of rollers $V_2$.

In this embodiment, the positions of the upper rollers (3, 2) of the first and second pairs can be raised or lowered so that the distances a and b are adjusted to the thickness c of the dough to be stretched (1) and the thickness e of the dough after being stretched (6), respectively. In contrast, the lower rollers (2', 3') and the transfer roller (4) are fixedly positioned so that their uppermost parts align on a straight line as shown in FIG. 1.

The transfer roller (4) is a roller freely rotatable about its axis. Therefore, as the dough is conveyed by the first and second pairs of rollers (2, 2', 3, and 3'), the transfer roller (4) on which the dough is supplied rotates in the same direction as that of the lower rollers (2', 3') of the first and second pairs of rollers.

The vibration imparting body (5) consists of an elongated member positioned transversely of the dough and has a bullet-like cross-sectional shape. As indicated by arrows m, the body (5) is repeatedly raised and lowered so that its round lower end can touch and press the upper surface of the dough (1).

Figure 2:
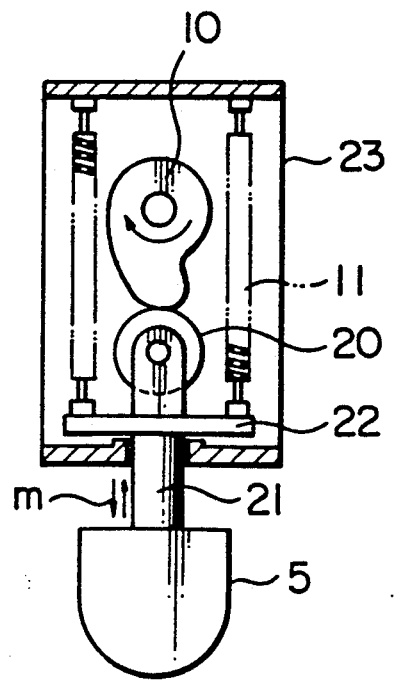
FIG. 2 is an enlarged view of the mechanism that vertically moves the body (5) in FIG. 1.

FIG. 2 shows a mechanism to vertically move the vibration-imparting body (5). The mechanism comprises a cam (10), a housing (23), and a cam tracing roller (20) connected to the body (5) via an arm (21) extending from the bottom wall of the housing (23). A plate (22) is fixed on the arm (21). By connecting the plate (22) and the top wall of the housing (23) with a pair of springs (11), the cam tracing roller (20) is forcibly contacted by the periphery of the cam (10). As shown in FIG. 2, the cam (10) has an eccentric shape and the distance from its axis to its periphery varies. The axis of the cam is connected to a motor (not shown) so that the cam (10) rotates as shown by an arrow r in FIG. 2. As the cam (10) rotates, the body (5) is vertically moved as shown by arrows m, while the cam tracing roller (20) traces the periphery of the cam (10).

Returning to FIG. 1, the vibration-imparting body (5) is positioned above and spaced apart from the transfer roller (4). As shown in FIG. 1, the distance between the lowermost part of the body (5) and the uppermost part of the transfer roller (4) when the body is in its lowermost position (5') as indicated by a dotted line in FIG. 1 is shown as d. The position of the vertical movement mechanism of FIG. 2 holding the body (5) can be raised or lowered so that the distance d can be adjusted to be less than the thickness c of the dough (1) and thus to be less than the distance a of the space between the first pair of rollers when the body (5) is at it lowest position, and the distance d can be adjusted to be sufficiently greater than the thickness c of the dough (1) when the body (5) is at its highest position.

In operation, the dough (1) is supplied into the space between the first pair of rollers (2, 2'). The dough fed out of the first pair of rollers (2, 2') passes through the space between the transfer roller (4) and the vibration-imparting body (5) and then is supplied into the space between the second pair of rollers (3, 3'). Since the peripheral speeds ($V_1$, $V_2$) of the first and second pairs of rollers are selected so that a tensile stress is imparted to the area of the dough (1) which is between the points where the upper rollers (2, 3) of the respective pairs of rollers (2, 2', 3 and 3') are closest to the lower rollers (2', 3'), the dough is stretched. Because of the rhythmic vibrations imparted to the area of the dough with the body (5), the thixotropic effect occurs, which causes the flow of the dough in the area. Therefore, the dough can be easily stretched by being subjected to a low tensile stress without being subjected to high pressure exceeding the point at which it loses its elasticity. In this area of the dough, the tensile stress is averaged, and the dough is uniformly stretched without being torn.

Assuming that the width of the dough is unchanged throughout the stretching, and the dough resilience is zero, the result of the following equation approximately holds:

$$bV_2 = aV_1$$

where a and b are representative values of the distances between the upper and lower rollers of the first and second pairs respectively, and $V_1$ and $V_2$ are representative values of the peripheral speeds of the first and second pairs of rollers, respectively.

It has been discovered by conducting experiments that dough can effectively be stretched when the position of the vertical movement mechanism is adjusted so that the distance d of the body (5) equals about ⅓ of the thickness c of the dough to be stretched (1). However, when the thickness reduction ratio e/c (the ratio between the thickness e of dough after stretching (6) to the thickness c of dough to be stretched (1)) is small, the position of the vertical movement mechanism is adjusted so that the distance d of the body (5) equals about ¼ of the thickness c. In contrast, when the thickness reduction ratio e/c is large the position of the vertical movement mechanism is adjusted so that the distance d of the body (5) equals ½ of the thickness e.

Please note that in this invention the thickness reduction ratio e/c also varies based on the number of vibrations imparted by the body (5). That is, if the thickness reduction ratio e/c decreases, the number of vibrations imparted should increase.

In an experiment, dough (1) having a thickness c of 30 mm was supplied at a speed of 3 m/min (v=3000 mm/min), and the vibration imparting body (5) had a width f of 50 mm. When the body (5) was adjusted so that the distance d was ⅓ of the dough thickness c, and the number of vibrations imparted by the vibration imparting body (5) was set at 20 to 50 per second, the thickness reduction rate e/c was 1/5. That is, the dough (1) was able to be stretched to a final thickness e of 6 mm.

The above result is very remarkable as compared to the thickness reduction ratio e/c obtained by the above-mentioned prior art apparatus that includes a plurality of pairs of compressing rollers.

In this apparatus, dough can also be stretched to have a desired thickness by adjusting the distances a and b, and the peripheral speeds $V_1$ and $V_2$. For example, under the conditions of the above-described experiment, a dough of 30 mm can be stretched to have any thickness greater than 6 mm by changing the parameters a, b, $V_1$ and $V_2$ in the above equation: $bV_2 = aV_1$.

Figure 3:
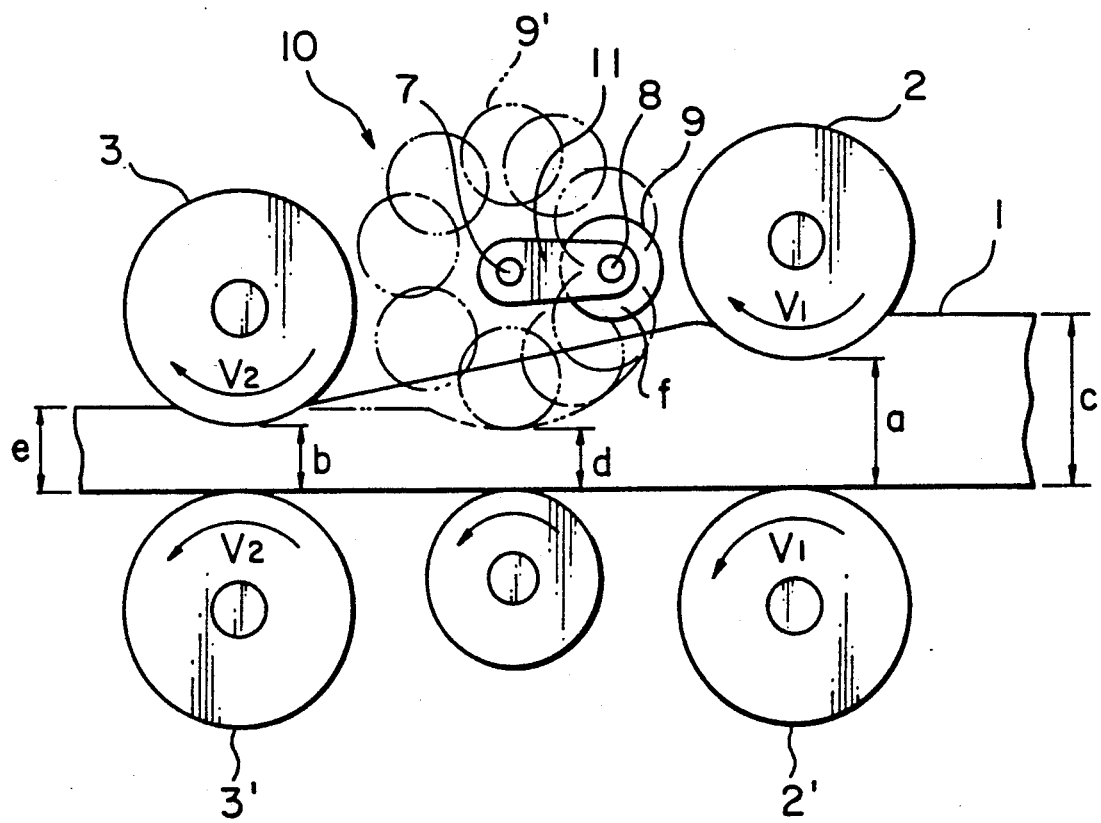
FIG. 3 shows the apparatus for stretching dough of the second embodiment of this invention.

In FIG. 3 the apparatus for stretching dough of the second embodiment of this invention is shown. In this apparatus, the construction of the apparatus is the same as that of the apparatus in FIG. 1, except that the body (5) is replaced with a roller mechanism (10).

The roller mechanism (10) comprises an axis (7) extending transversely to the dough (1) and positioned above the transfer roller (4) and a roller (9) connected to the axis (7) via arms (11) mounted to both ends of the axis. The roller (9) is freely rotatable about its axis (8). The axis (7) is connected to a driven shaft of a motor (not shown) so that the arms (11) rotate about the axis (7) as indicated by the arrow f in FIG. 3. Therefore, the roller (9) moves along a locus (9') as shown by dotted lines in FIG. 3. The position of the axis (7) can be raised or lowered so that the distance d between the lowest part of the roller (7) and the highest part of the transfer roller (4) when they are closest to each other can be adjusted.

In operation, the roller (9) contacts and is pressed against the dough and then is repeatedly released from it as the arms (11) rotate about the axis (7). Therefore, the roller mechanism (10) imparts vibrations similar to those imparted by the body (5) in FIG. 1.

Figure 4:
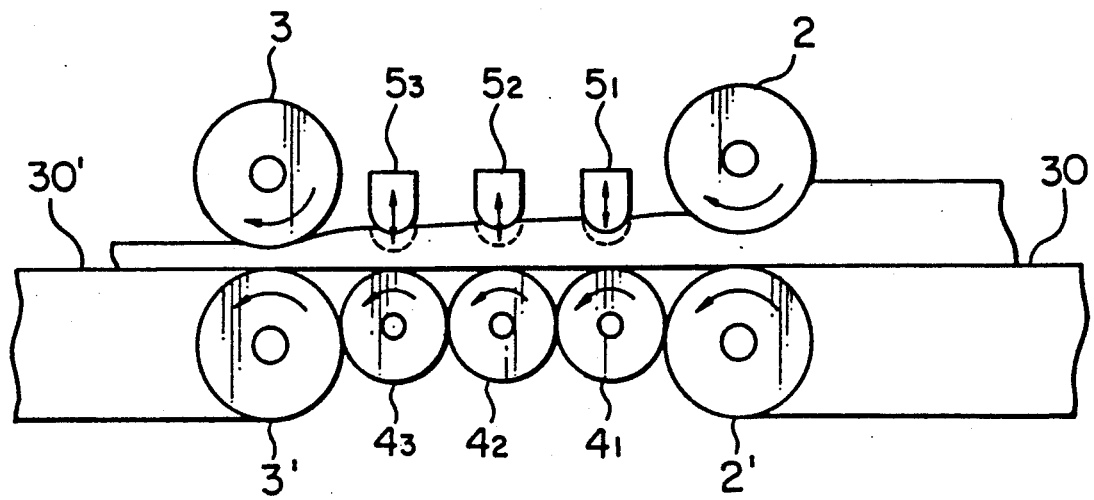
FIG. 4 shows the apparatus for stretching dough of the third embodiment of this invention.

FIG. 4 shows the apparatus for stretching dough of the third embodiment of this invention. In this embodiment, around the lower rollers (2', 3') of the first and second pairs of rollers endless belts (30, 30') are wound and three transfer rollers ($4_1$, $4_2$, $4_3$), roller (4), and three vibration-imparting bodies ($5_1$, $5_2$, $5_3$), are arranged in series between the lower roller (2' and 3'). The three rollers ($4_1$, $4_2$, $4_3$) are driven at different speeds so that the peripheral speed of any one of the rollers is faster than that of its upstream roller. The lower roller (2') of the first pair is driven so that its endless belt (30) moves slower than the peripheral speed of the most upstream roller ($4_1$) of the three rollers. The lower roller (3') of the second pair is driven so that its endless belt (30') moves faster than the peripheral speed of the most downstream roller ($4_3$). These endless belts are wound around the lower rollers (2', 3') and rollers (not shown) to construct conventional endless belt conveyors. The structure of the bodies and transfer rollers are the same as those in FIG. 1.

The bodies ($5_1$, $5_2$, $5_3$) are arranged so that the lowermost parts of the bodies are positioned on a straight line. The uppermost parts of the transfer rollers ($4_1$, $4_2$, $4_3$) are also positioned on a straight line. The gap formed between the straight lines defined by the uppermost parts of the transfer rollers ($4_1$, $4_2$, $4_3$) and the lowermost parts of the bodies ($5_1$, $5_2$, $5_3$) becomes progressively narrower in the downstream direction. The positions of the vertical movement mechanisms (not shown) holding the bodies ($5_1$, $5_2$, $5_3$) are lowered or raised so that the distances between the bodies (5) and the transfer rollers (4) are smaller than those between the first pair of rollers (2, 2') when they are at their lowest positions and are greater than the thickness of the dough to be stretched when the bodies (5) are raised to their highest positions. By repeatedly raising and lowering the bodies (5), vibrations are imparted to the dough while it is subjected to a tensile stress caused by the difference in the peripheral speeds of the rollers (2', 3', $4_1$, $4_2$, $4_3$).

Alternatively, these transfer rollers ($4_1$, $4_2$, $4_3$) can be replaced with an endless belt device that is driven at a speed faster than the peripheral speed of the first pair of rollers (2) and slower than that of the second pair of rollers (3).

Further, the transfer roller (4) in FIG. 1 can be replaced with a roller driven at a peripheral speed faster than that of the first pair of rollers (2, 2') and slower than that of the second pair of rollers (3, 3'). The transfer roller (4) in FIG. 1 can also be replaced by an endless belt device driven at a speed slower than the peripheral speed of the first pair of rollers (2, 2') and faster than that of the second pair of rollers (3, 3').

In the apparatus of this invention no high pressure damaging the gel structure of gluten in dough can be imparted to the dough during the stretching step. For example, we measured, by a strain gauge, the instantaneous pressure imparted to dough where dough 30 mm thick was supplied into the space between the vibration-imparting body (5) and the transfer roller (4) of the first embodiment, where the distance d was set at 10 mm.

This measurement disclosed that an instantaneous pressure equal to or less than 500 g/cm$^2$ was able to be imparted to dough during the stretching process. We found that such a pressure does not damage the gel structure of gluten in dough.

Since the gel structure of gluten, which provides an elasticity to dough, can be maintained without being damaged, dough of an excellent quality can be provided when it is stretched by the apparatus of this invention. Such dough expands sufficiently when it is baked and can provide puffy and tasty bread.

I claim:

1. A method for stretching dough comprising the steps of:
   a) supplying said dough into a first space between a first pair of rollers rotating in the same direction where they face each other and at the same peripheral speed, and then into a second space, narrower than said first space, between a second pair of rollers positioned downstream of said first pair of rollers and rotating in the same direction where they face each other and at the same peripheral speed, which is faster than said peripheral speed of said first pair of rollers, said first and second spaces being adjustable,
   b) stretching said dough under tensile stress while vibrations are imparted to said dough by a vibration means positioned between said first and second pairs of rollers.

2. The method of claim 1, wherein said vibration means comprises a holding means for holding said dough and a body spaced apart from said holding means to provide a path for said dough, said body adapted to repeatedly move toward and away from said holding means so that the space between them is smaller than that space between said upstream pair of rollers when said body is at the position closest to said holding means, and sufficiently greater than the thickness of said dough when said body is furthest from said holding means.

3. The method of claim 2, further comprising means for adjusting said space between said body and said holding means.

4. The method of claim 2, wherein said holding means comprises a transfer roller adapted to freely rotate about its axis.

5. The method of claim 2, wherein said holding means comprises a roller adapted to be driven so that its peripheral speed is faster than that of said upstream pair of rollers and slower than that of said downstream pair of rollers.

6. The method of claim 2, wherein said holding means comprises an endless conveyor adapted to be driven so that its conveying speed is faster than the peripheral speed of said upstream pair of rollers and slower than that of said downstream pair of rollers.

7. The method of claim 2, wherein said vibration means comprises a plurality of said holding means and a corresponding number of said bodies opposite said holding means.

8. The method of claim 1, wherein said vibration means comprises an endless belt conveyor adapted to be driven at the speed faster than the peripheral speed of said upstream pair of rollers and slower than said downstream pair of rollers, and a plurality of bodies positioned and spaced apart from the conveying path of said endless belt conveyor to provide a path for said dough, said bodies adapted to repeatedly move toward and away from said endless belt conveyor so that the space between them is smaller than that space between said upstream pair of rollers when said bodies are at the position closest to said endless belt conveyor, and sufficiently greater than the thickness of said dough when said bodies are furthest from said endless belt conveyor.

9. The method of claim 8, further comprising means for adjusting said space between said bodies and said endless belt conveyor.

10. The method of claim 1, wherein said vibration means comprises a roller mechanism and a holding means for holding said dough positioned and spaced apart from said roller mechanism to provide a path for said dough, said roller mechanism comprising an axis, a member adapted to move about said axis, and a freely rotatable roller mounted on said member, and said roller mechanism being positioned so that the space between said roller mechanism and said holding means is smaller than said upstream pair of rollers when said freely rotatable roller is positioned closest to said holding means, and sufficiently greater than the thickness of the dough when said freely rotatable roller is out of the path of the dough.

11. The method of claim 10, further comprising means for adjusting said space between said freely rotatable roller and said holding means.

* * * * *

UNITED STATES PATENT AND TRADEMARK OFFICE
CERTIFICATE OF CORRECTION

PATENT NO.    :   5,039,542
DATED         :   August 13, 1991
INVENTOR(S)   :   Torahiko Hayashi It is certified that error appears in the above-identified patent and that said Letters Patent is hereby corrected as shown below:

On the title page, under item [19] and in item [75],

Inventor, last name should read --Hayashi--.

Signed and Sealed this

Thirtieth Day of March, 1993

*Attest:*

STEPHEN G. KUNIN

*Attesting Officer*   Acting Commissioner of Patents and Trademarks